(12) United States Patent
Tang (10) Patent No.: US 11,895,704 B2
(45) Date of Patent: Feb. 6, 2024

(54) METHOD AND APPARATUS FOR TRANSMITTING SIGNAL, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/156,510

(22) Filed: Jan. 22, 2021

(65) Prior Publication Data

US 2021/0144777 A1 May 13, 2021

Related U.S. Application Data (63) Continuation of application No. PCT/CN2018/097041, filed on Jul. 25, 2018.

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01); *H04W 74/008* (2013.01)

(58) Field of Classification Search
CPC ............. H04W 74/004; H04W 74/008; H04W 74/0833
See application file for complete search history.

(56) References Cited

U.S. PATENT DOCUMENTS

| 11,026,267 B2 * | 6/2021 | Yan | H04W 72/10 |
| 11,197,316 B2 * | 12/2021 | Kato | H04W 74/008 |
| 11,736,993 B2 * | 8/2023 | Liu | H04W 76/27 |
| | | | 370/331 |

(Continued)

FOREIGN PATENT DOCUMENTS

| CN | 107889273 A | 4/2018 |
| CN | 108271275 A | 7/2018 |

(Continued)

OTHER PUBLICATIONS

International Search Report in the international application No. PCT/CN2018/097041, dated Apr. 12, 2019.

(Continued)

*Primary Examiner* — Liton Miah
(74) *Attorney, Agent, or Firm* — PERKINS COIE LLP (57) ABSTRACT

This application discloses a method and apparatus for transmitting a signal, a terminal device, and a network device. The method for transmitting a signal includes: transmitting, by a terminal device in a first-type random access process, a first message to a network device, and obtaining first indication information from the network device, the first message including a first preamble and first uplink data; and determining, by the terminal device based on the first indication information, whether to make another transmission of the first message to the network device another time, the retransmitted first message including the first preamble and/or the first uplink data, or whether to fall from the first-type random access process back to a second-type random access process.

6 Claims, 5 Drawing Sheets

(56) References Cited

U.S. PATENT DOCUMENTS

| | | | | |
|---|---|---|---|---|
| 2015/0117233 | A1* | 4/2015 | Wong | H04W 72/02 |
| | | | | 370/336 |
| 2020/0245361 | A1* | 7/2020 | Xiong | H04W 74/006 |
| 2020/0404711 | A1* | 12/2020 | Zhao | H04W 52/36 |
| 2021/0168862 | A1* | 6/2021 | Murray | H04W 74/002 |
| 2021/0297126 | A1* | 9/2021 | Cao | H04B 7/0617 |

FOREIGN PATENT DOCUMENTS

| | | |
|---|---|---|
| CN | 108282897 A | 7/2018 |
| JP | 2019533326 A | 11/2019 |
| WO | 2018062925 A1 | 4/2018 |
| WO | 2018064367 A1 | 4/2018 |
| WO | 2018066934 A2 | 4/2018 |

OTHER PUBLICATIONS

Asustek: "Consideration on fallback of 2-step RACH procedure", 3GPP Draft; R2-1700358, Jan. 17, 2017 (Jan. 17, 2017), XP051210937. 4 pages.

Asustek et al: "Consideration on use cases of 2-step RACH procedure", 3GPP Draft; R2-1700356, Jan. 17, 2017 (Jan. 17, 2017), XP 051210935. 4 pages.

Sony: "2-step RACH to 4-step RACH fallback", 3GPP Draft; R2-1700137, Jan. 17, 2017 (Jan. 17, 2017), XP051210722. 3 pages.

Supplementary European Search Report in the European application No. 18927842.7, dated Jun. 14, 2021. 13 pages.

First Office Action of the Chinese application No. 202010608528.2, dated Jul. 23, 2021. 18 pages with English translation.

Written Opinion of the International Search Authority in the international application No. PCT/CN2018/097041, dated Apr. 12, 2019. 9 pages with English translation.

Second Office Action of the Chinese application No. 202010608528.2, dated Nov. 2, 2021. 12 pages with English translation.

Office Action of the Indian application No. 202127004708, dated Jan. 10, 2022. 7 pages with English translation.

First Office Action of the European application No. 18927842.7, dated Feb. 9, 2022. 11 pages.

ZTE Corporation, ZTE Microelectronics, "On 2-step Random access procedure", 3GPP TSG RAN WG1 Meeting #86b R1-1608969, Lisbon, Portugal, Oct. 10-14, 2016. 3 pages.

Samsung, "NR 2-step random access procedure", 3GPP TSG RAN WG1 NR Ad Hoc R1-1700892, Spokane, Washington, USA, Jan. 16-20, 2017. 5 pages.

First Office Action of the Japanese application No. 2021-504265, dated Jun. 17, 2022. 19 pages with English translation.

Second Office Action of the European application No. 18927842.7, dated Aug. 5, 2022. 6 pages.

Third Office Action of the European application No. 18927842.7, dated Feb. 1, 2023. 8 pages.

Hearing Notice of the Indian application No. 202127004708, issued on Apr. 17, 2023. 2 pages.

\* cited by examiner

METHOD AND APPARATUS FOR TRANSMITTING SIGNAL, TERMINAL DEVICE, AND NETWORK DEVICE

CROSS-REFERENCE TO RELATED APPLICATION

The present disclosure is a continuation application of PCT Application No. PCT/CN2018/097041, filed on Jul. 25, 2018, the entire disclosure of which is hereby incorporated by reference.

BACKGROUND

Technical Field

Embodiments of this application relate to the field of mobile communications technologies, and specifically to a method and apparatus for transmitting a signal, a terminal device, and a network device.

Related Art

In a 5th generation (5G) system, a 4-step process similar that to long term evolution (LTE) is used in a random access channel (RACH) process. However, a 4-step RACH process has relatively high latency overheads, and is not suitable for a low-latency and high-reliability scenario in 5G. In a standardization process of new radio (NR), considering characteristics of related low-latency and high-reliability services, a 2-step RACH process is provided, and can reduce access latency compared with the 4-step RACH process.

In the 2-step RACH process, there may be a fallback to a 4-step RACH process. On the other hand, for the first step of the 2-step RACH process, an MSG1 includes two parts of signals, that is, a preamble and a physical uplink shared channel (PUSCH). In some cases, the two parts of signals are both received by a base station.

SUMMARY

Embodiments of this application provide a method for transmitting a signal and apparatus, a terminal device, and a network device, to determine a retransmission behavior for an MSG1 on a terminal side and a fallback to a 4-step RACH process according to a reception situation of the MSG1.

An embodiment of this application provides a method for transmitting a signal, including:

transmitting, by a terminal device in a first-type random access process, a first message to a network device, and obtaining first indication information from the network device, the first message including a first preamble and first uplink data; and determining, by the terminal device based on the first indication information, whether to make another transmission of the first message to the network device another time, the retransmitted first message including the first preamble and/or the first uplink data, or whether to fall from the first-type random access process back to a second-type random access process.

An embodiment of this application provides a method for transmitting a signal, including:

receiving, by a network device in a first-type random access process, a first message transmitted by a terminal device, the first message including a first preamble and first uplink data; and transmitting, by the network device, first indication information to the terminal device, the first indication information being used to indicate to the terminal device whether to make another transmission of the first message to the network device another time, the retransmitted first message including the first preamble and/or the first uplink data, or whether to fall from the first-type random access process back to a second-type random access process.

An embodiment of this application provides an apparatus for transmitting a signal, including:

a transmission unit, configured to transmit, in a first-type random access process, a first message to a network device, and obtain first indication information from the network device, the first message including a first preamble and first uplink data; and a processing unit, configured to determine, based on the first indication information, whether to make another transmission of the first message to the network device another time, the retransmitted first message including the first preamble and/or the first uplink data, or whether to fall from the first-type random access process back to a second-type random access process.

An embodiment of this application provides an apparatus for transmitting a signal, including:

a transmission unit, configured to receive, in a first-type random access process, a first message transmitted by a terminal device, the first message including a first preamble and first uplink data; transmit first indication information to the terminal device, the first indication information being used to indicate to the terminal device whether to make another transmission of the first message to the network device another time, the retransmitted first message including the first preamble and/or the first uplink data, or whether to fall from the first-type random access process back to a second-type random access process.

An embodiment of this application provides a terminal device, including a processor and a memory. The memory is configured to store a computer program, and the processor is configured to invoke and run the computer program stored in the memory, to perform the foregoing method for transmitting a signal.

An embodiment of this application provides a network device, including a processor and a memory. The memory is configured to store a computer program, and the processor is configured to invoke and run the computer program stored in the memory, to perform the foregoing method for transmitting a signal.

An embodiment of this application provides a chip, configured to implement the foregoing method for transmitting a signal.

Specifically, the chip includes a processor, configured to invoke, from a memory, and run a computer program, to enable a device equipped with the chip to perform the foregoing method for transmitting a signal.

An embodiment of this application provides a computer-readable storage medium, configured to store a computer program, the computer program causing a computer to perform the foregoing method for transmitting a signal.

An embodiment of this application provides a computer program product, including a computer program instruction, the computer program instruction causing a computer to perform the foregoing method for transmitting a signal.

An embodiment of this application provides a computer program, the computer program, when run on a computer, causing the computer to perform the foregoing method for transmitting a signal.

According to the foregoing technical solutions, in the first-type random access process (that is, a 2-step RACH process), the terminal device transmits both the first preamble and the first uplink data to the network device based on the first message (that is, an MSG1), and when the network device does not completely receive the first message, the network device indicates to the terminal device whether to make another transmission of at least one of the first preamble and the first uplink data another time or whether to fall back to the second-type random access process (that is, a 4-step RACH process), so that the terminal device may make another transmission another time in an appropriate manner or directly fall back to the second-type random access process according to a reception situation of the first message, thereby reducing uplink interference and power consumption.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DETAILED DESCRIPTION

The technical solutions of the embodiments of this application will be described in the following with reference to the accompanying drawings. It is obvious that the embodiments to be described are some rather than all of the embodiments of this application. All other embodiments obtained by a person of ordinary skill in the art based on the embodiments of the present application without creative efforts shall fall within the protection scope of the present application.

The technical solutions in the embodiments of this application may be applied to various communications systems, such as a Global System of Mobile communication (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or a 5G system.

Figure 1:
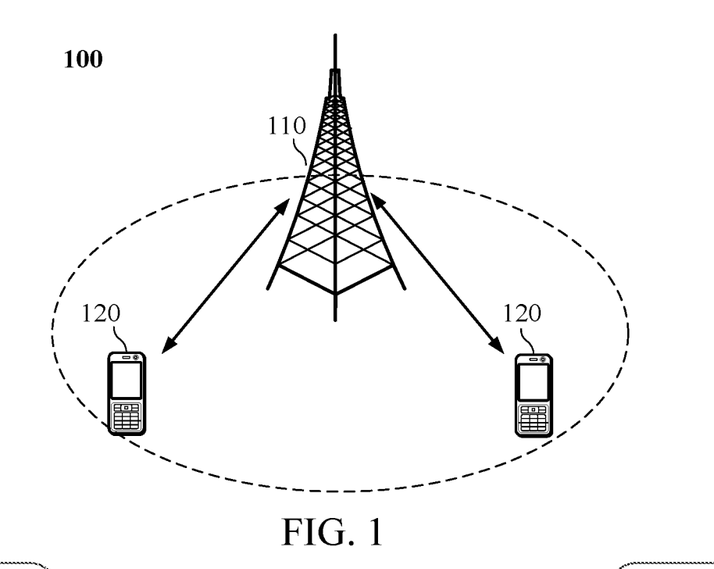
FIG. 1 is a schematic architectural diagram of a communications system according to an embodiment of this application.

For example, a communications system 100 used in an embodiment of this application is shown in FIG. 1. The communications system 100 may include a network device 110, and the network device 110 may be a device communicating with a terminal device 120 (or referred to as a communications terminal or a terminal). The network device 110 may provide communication coverage for a particular geographical area, and may communicate with a terminal device that is located in the coverage. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network side device in a 5G network, a network device in a future evolved public land mobile network (PLMN), or the like.

The communications system 100 further includes at least one terminal device 120 located inside a coverage area of the network device 110. The "terminal device" used herein includes, but is not limited to a device that is configured to receive/transmit communication signals via a wired connection, such as via a public switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another terminal device; and/or an Internet of Things (IoT) device. A terminal device configured to communicate through a wireless interface may be referred to as a "wireless communications terminal", "wireless terminal" or "mobile terminal". Examples of the mobile terminal include, but are not limited to, a satellite or a cellular telephone; a personal communications system (PCS) terminal that may combine a cellular radiotelephone with data processing, facsimile and data communication capabilities; a personal digital assistant (PDA) that can include a radiotelephone, a pager, Internet/Intranet access, a web browser, a notepad, a calendar, and/or a global positioning system (GPS) receiver; and a conventional laptop and/or palmtop receiver or another electronic device that includes a radiotelephone transceiver. A terminal device may be an access terminal, user equipment (User Equipment, UE), a subscriber unit, a subscriber station, a mobile station, a mobile, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Optionally, the terminal devices 120 may perform device to device (D2D) communication with each other.

Optionally, the 5G system or 5G network may be further referred to as a new radio (NR) system or NR network.

FIG. 1 shows one network device and two terminal devices as an example.

Optionally, the communications system 100 may include a plurality of network devices and coverage of each network device may include another number of terminal devices. The number is not limited in this embodiment of this application.

Optionally, the communications system 100 may further include other network entities such as a network controller and a mobility management entity. The entity is not limited in this embodiment of this application.

It should be understood that, the device having a communication function in the network/system in this embodiment of this application may be referred to as a communications device. Taking the communications system 100 shown in FIG. 1 as an example, the communications device may include a network device 110 and a terminal device 120 having a communication function. The network device 110 and the terminal device 120 may be specific devices described above, and details are not described herein again. The communications device may also include other devices in the communications system 100, for example, a network controller, a mobility management entity, and another network entity, and the device is not limited in this embodiment of this application.

It should be understood that, terms "system" and "network" in this specification are usually interchangeably used in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

For ease of understanding the technical solutions in the embodiments of this application, the following describes a 4-step RACH process and a 2-step RACH process separately.

Figure 2:
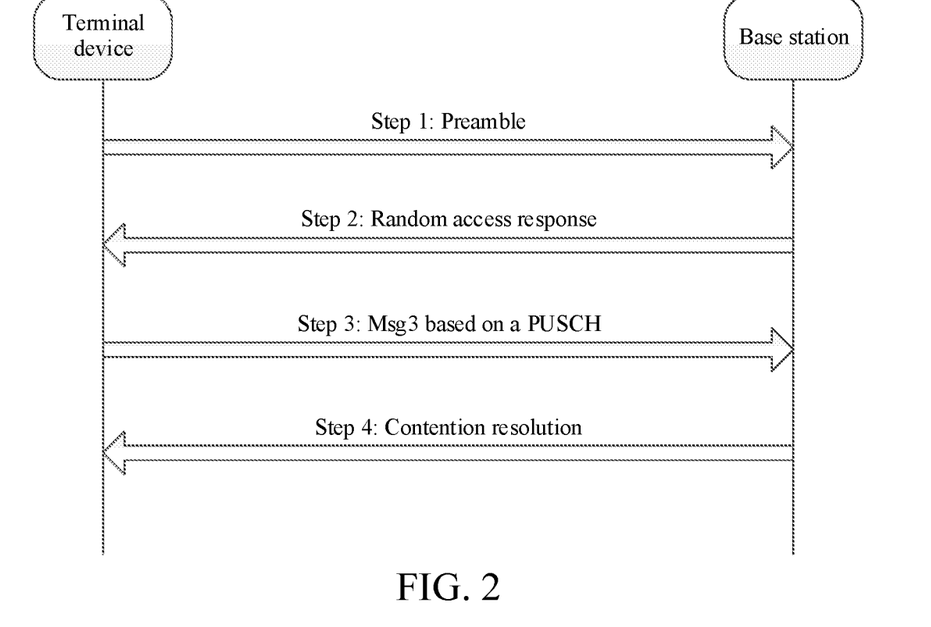
FIG. 2 is a schematic diagram of a 4-step RACH process according to an embodiment of this application.

Referring to FIG. 2, the 4-step RACH process includes the following four steps:

The first step (step 1): A terminal device transmits a preamble (that is, a preamble sequence) to a base station by using a Message 1 (MSG1), where the preamble herein is a randomly selected preamble.

The second step (step 2): After detecting that the terminal device transmits the preamble, the base station transmits a random access response (RAR) to the terminal device by using a Message 2 (MSG2), to inform the terminal device of information of an uplink resource that may be used when the terminal device transmits a Message 3 (MSG3), assigns a radio network temporary identity (RNTI) to the terminal device, and provides the terminal device with a time advance command and the like.

The third step (step 3): After receiving the RAR, the terminal device transmits an MSG3 message in an uplink resource specified by the RAR message, the MSG3 message carrying information of a specific temporary identity of the terminal device.

The fourth step (step 4): The base station transmits a contention resolution message to the terminal device by using a Message 4 (MSG4), and assigns uplink transmission resource to the terminal device. When receiving the MSG4 transmitted by the base station, the terminal device detects whether the specific temporary identity of the terminal device transmitted by the terminal device on the MSG3 is included in the contention resolution message transmitted by the base station, and if yes, it indicates that a random access process of the terminal device succeeds; otherwise, it is considered that the random access process fails, and the terminal device needs to initiate a random access process again starting from the first step.

Figure 3:
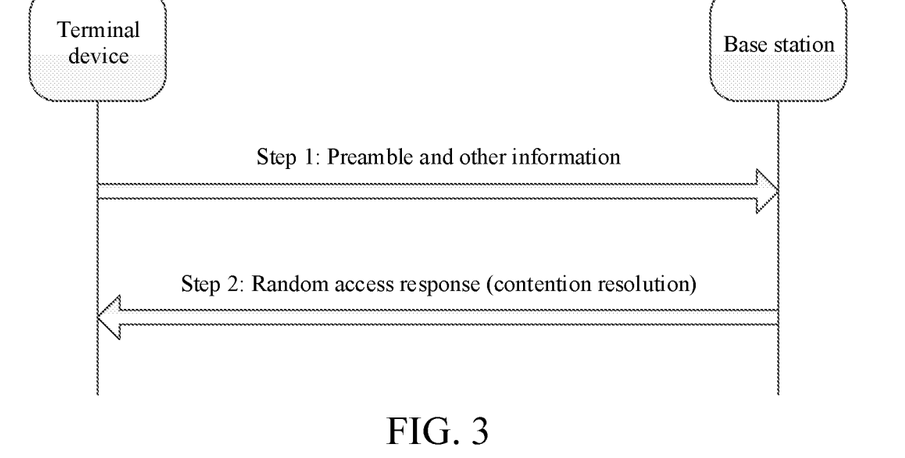
FIG. 3 is a schematic diagram of a 2-step RACH process according to an embodiment of this application.

The 4-step RACH process has relatively high latency overheads. In a standardization process of NR, considering characteristics of related low-latency and high-reliability services, a 2-step RACH process is provided, and can reduce access latency compared with the 4-step RACH process. Referring to FIG. 3, the 2-step RACH process includes the following two steps.

The first step (step 1): A terminal device transmits a preamble (that is, a preamble sequence) and other information to a base station by using an MSG1.

The other information here may also be referred to as uplink data transmitted through a physical uplink shared channel (PUSCH), for example, information of a specific temporary identity of the terminal device.

The second step (step 2): After detecting that the terminal device transmits a PUSCH, the base station transmits a RAR message and a contention resolution message to the terminal device by using an MSG2.

Figure 4:
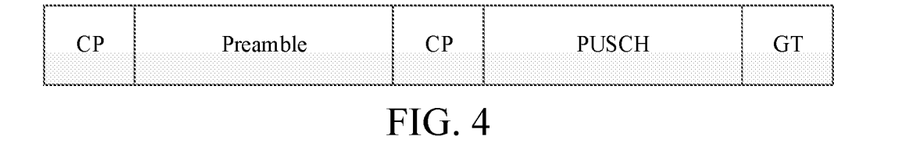
FIG. 4 is a schematic diagram of information transmitted in the first step of a 2-step RACH process according to an embodiment of this application.

The first step of the 2-step RACH process is equivalent to a combination of the first step and the third step of the 4-step RACH process, and the second step of the 2-step RACH process is equivalent to a combination of the second step and the fourth step of the 4-step RACH process. Therefore, in the first step of the 2-step RACH process, the terminal device needs to transmit the preamble and the PUSCH. As shown in FIG. 4, a cyclic prefix (CP) is set in front of the preamble and between the preamble and the PUSCH, and a guaranteed time (GT) is set behind the PUSCH.

In the 2-step RACH process, there may be a fallback to the 4-step RACH process. In a scenario, when the network detects the preamble and the PUSCH, the 2-step RACH process is used, and when the network detects only the preamble, a fallback to the 4-step RACH process is performed.

In the 2-step RACH process, the MSG1 includes the preamble and the PUSCH. In some cases, the two signals are not both received by the base station, and in this case, the MSG1 needs to be retransmitted.

Figure 5:
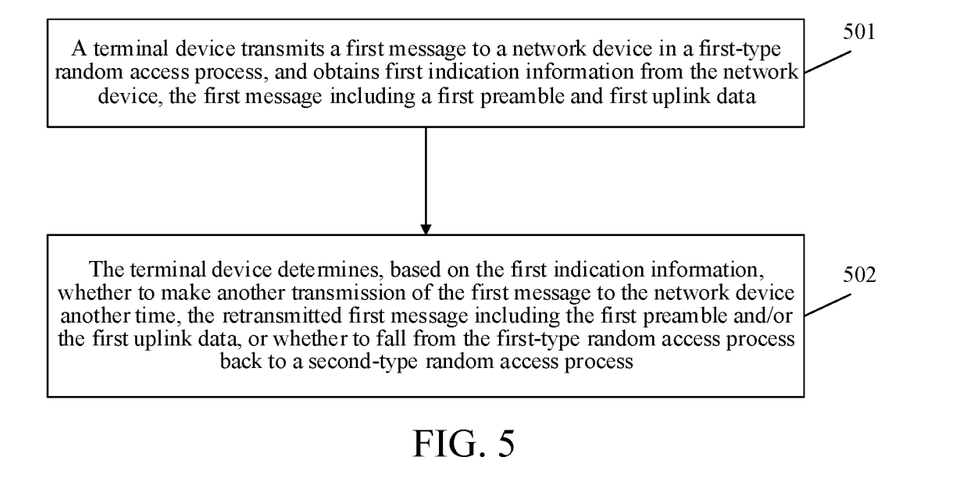
FIG. 5 is a schematic flowchart 1 of a method for transmitting information according to an embodiment of this application.

FIG. 5 is a schematic flowchart 1 of a method for transmitting information according to an embodiment of this application. As shown in FIG. 5, the method for transmitting information includes the following steps.

Step 501: A terminal device transmits a first message to a network device in a first-type random access process, and obtains first indication information from the network device, the first message including a first preamble and first uplink data.

In this embodiment of this application, the terminal device may be any device capable of communicating with a network device, for example, a mobile phone, a tablet computer, a notebook computer, and an in-vehicle terminal.

In this embodiment of this application, the network device may be a base station, such as a gNB in 5G, an eNB in LTE, and the like.

In this embodiment of this application, the terminal device may perform the 2-step RACH process (referring to FIG. 3), or may perform the 4-step RACH process (referring to FIG. 2). Herein, the 2-step RACH process is also referred to as the first-type random access process, and the 4-step RACH process is also referred to as the second-type random access process.

In an implementation, the terminal device needs to perform the first-type random access process (that is, the 2-step RACH process) to reduce latency, so that the terminal device needs to transmit a first preamble and first uplink data to a network device by using a first message in the first step, where the first message may also be referred to as an MSG1, the first uplink data is transmitted through a PUSCH, and the first uplink data, for example, includes information of a specific temporary identity of the terminal device.

After transmitting the first preamble and the first uplink data, the terminal device receives first indication information transmitted by the network device. Specifically, the network device determines the first indication information according to a reception situation of the first message by the network device, where the reception situation of the first message by the network device may be as follows: (1) the network device receives only the first preamble; (2) the network device receives only the first uplink data; (3) the network device receives both the first preamble and the first uplink data; and (4) the network device does not receive the first preamble and the first uplink data. The reception situations that can be determined by the network device are the foregoing (1), (2) and (3). The reception situation (4) can only be determined by the terminal device. For the reception situation (3), the network device and the terminal device may continue performing the first-type random access process, that is, the 2-step RACH process. For the reception situations (1) and (2), the network device needs to transmit first indication information to the terminal device, where the first indication information is used to indicate to the terminal device whether to make another transmission of the first message to the network device another time, or whether to fall from the first-type random access process back to the second-type random access process. Further, if the first indication information is used to indicate to the terminal device whether to make another transmission of the first message to the network device another time, the first indication information further indicates content of the retransmitted first message and a corresponding transmission parameter.

Step 502: The terminal device determines, based on the first indication information, whether to make another transmission of the first message to the network device another time, the retransmitted first message including the first preamble and/or the first uplink data, or whether to fall from the first-type random access process back to a second-type random access process.

In this embodiment of this application, a specific behavior indicated by the first indication information is determined based on the reception situation of the first message by the network device. In an implementation, the implementation of the first indication information includes an explicit indication and an implicit indication. The explicit indication includes explicitly carrying the first indication information in the MSG2 in the 2-step RACH process. The implicit indication includes determining the first indication information based on an RNTI used for PDCCH scrambling for transmitting the MSG2. The following describes the specific behavior indicated by the first indication information with reference to the reception situation of the first message by the network device.

(1) The network device receives only the first preamble.

(1.1) The first indication information is used to instruct to make another transmission of the first message another time, where the retransmitted first message includes the first uplink data, or the retransmitted first message includes the first uplink data and the first preamble.

In a case that the retransmitted first message includes the first uplink data, when retransmitting the first message, the terminal device adjusts a transmission parameter of the first uplink data.

In a case that the retransmitted first message includes the first uplink data and the first preamble, when retransmitting the first message, the terminal device adjusts a transmission parameter of the first uplink data is adjusted, maintains a transmission power of the first preamble, and maintains a counter for recording a number of transmissions of the first preamble.

Herein, the transmission parameter of the first uplink data includes at least one of the following: a transmission power, a transmission resource, and a modulation and coding scheme (MCS).

The transmission power of the first uplink data includes a power offset parameter, the power offset parameter being used to indicate an offset of a power of the first uplink data from a power of the first preamble.

The transmission resource of the first uplink data is an uplink data channel resource associated with the first preamble, where the first preamble has an association relationship with one or more uplink data channel resources.

For example, in the 2-step RACH process, the terminal device transmits an MSG1 to the network device, the MSG1 including a preamble and a PUSCH, the network device receives only the preamble, the network device instructs the terminal device to make another transmission of the MSG1 another time, and the MSG1 may include only a PUSCH without a preamble, or may include both a PUSCH and a preamble. If the retransmitted MSG1 includes both a PUSCH and a preamble, a power of the preamble and a count of a number of transmissions of the preamble are not increased, but a transmission parameter of the PUSCH is adjusted; and if the retransmitted MSG1 includes only a PUSCH, a transmission parameter the PUSCH needs to be adjusted. Herein, adjusting a transmission parameter of the PUSCH includes adjusting a power offset of the PUSCH, and/or using another PUSCH resource associated with the preamble, and/or adjusting an MCS mode of the PUSCH, and the like.

(1.2) The first indication information is used to instruct to fall from the first-type random access process back to the second-type random access process.

Specifically, the terminal device receives a second message transmitted by the network device, the second message including an RAR message; the terminal device transmits a third message to the network device, the third message including the first uplink data; and the terminal device receives a fourth message transmitted by the network device, the fourth message including a contention resolution message.

For example, in the 2-step RACH process, the terminal device transmits an MSG1 to the network device, the MSG1 including a preamble and a PUSCH, the network device receives only the preamble, the network device instructs the terminal device to fall back to the 4-step RACH process, and the terminal device continues to perform the 4-step RACH process. In this case, the preamble of the MSG1 received in the 2-step RACH process is used as an MSG1 in the 4-step RACH process, and the network device subsequently transmits an RAR message to the terminal device in the 4-step RACH process.

(2) The network device receives only the first uplink data.

A probability that the network device receives only the first uplink data is relatively low. In the 4-step RACH process, a preamble is first transmitted for open-loop power control. After the base station detects the preamble and feeds back an RAR, UE sends a PUSCH carrying an MSG3. If a power of the preamble is not large enough to be detected by the base station, the PUSCH is not very likely to be detected by the gNB, but a case that the network device receives only the PUSCH is not excluded in this embodiment of this application.

(2.1) The first indication information is used to instruct to make another transmission of the first message another time, where the retransmitted first message includes the first preamble, or the retransmitted first message includes the first preamble and the first uplink data.

In a case that the retransmitted first message includes the first preamble, when retransmitting the first message, the terminal device adjusts a transmission power of the first preamble and a counter for recording a number of transmissions of the first preamble.

In a case that the retransmitted first message includes the first preamble and the first uplink data, when retransmitting the first message, the terminal device adjusts a transmission power of the first preamble and a counter for recording a number of transmissions of the first preamble, and maintains a transmission parameter of the first uplink data.

Herein, the transmission parameter of the first uplink data includes at least one of the following: a transmission power, a transmission resource, and an MCS.

The transmission power of the first uplink data includes a power offset parameter, the power offset parameter being used to indicate an offset of a power of the first uplink data from a power of the first preamble.

The transmission resource of the first uplink data is an uplink data channel resource associated with the first preamble, where the first preamble has an association relationship with one or more uplink data channel resources.

For example, in the 2-step RACH process, the terminal device transmits an MSG1 to the network device, the MSG1 including a preamble and a PUSCH, the network device receives only the PUSCH, the network device instructs the terminal device to make another transmission of the MSG1 another time, and the MSG1 may include only a preamble without a PUSCH, or may include both a preamble and a PUSCH. If the retransmitted MSG1 includes both a preamble and a PUSCH, a power and a count of the preamble are increased, and a transmission parameter of the PUSCH may be maintained; and if the retransmitted MSG1 includes only a preamble, a power and a count of the preamble need to be increased.

(2.2) The first indication information is used to instruct not to make another transmission of the first message another time, to continue performing the first-type random access process.

Specifically, the terminal device receives a fifth message transmitted by the network device, the fifth message including an RAR message and/or a contention resolution message.

For example, in the 2-step RACH process, the terminal device transmits an MSG1 to the network device, the MSG1 including a preamble and a PUSCH, the network device receives only the PUSCH, and the network device instructs the terminal device not to make another transmission of the MSG1 another time, to continue performing the 2-step RACH process, that is, the network device transmits MSG2 to the terminal device. Herein, the PUSCH of the MSG1, carrying UE identity information, is successfully received by the network device. A conflict may be resolved by using the MSG2, and there is no need to transmit the MSG1 again.

(3) The network device receives neither the first preamble nor the first uplink data.

This situation needs to be determined by the terminal. After the terminal device transmits the first preamble and the first uplink data to the network device, if no response is received from the network device within a certain period of time, the terminal device may determine that the network device receives neither the first preamble nor the first uplink data. In a case that the terminal device determines that the network device receives neither the first preamble nor the first uplink data, the terminal device retransmits the first message, where the retransmitted first message includes the first uplink data and the first preamble.

(3.1) When retransmitting the first message, the terminal device adjusts a transmission power of the first preamble and a counter for recording a number of transmissions of the first preamble, and maintains a transmission parameter of the first uplink data.

(3.2) When retransmitting the first message, the terminal device adjusts a transmission power of the first preamble and a counter for recording a number of transmissions of the first preamble, and adjusts a transmission parameter of the first uplink data.

For example, in the 2-step RACH process, the terminal device transmits an MSG1 to the network device, the MSG1 including a preamble and a PUSCH, if the terminal device does not receive a response from the network device within a certain period of time, the terminal device retransmits the MSG1, and the MSG1 includes both a preamble and a PUSCH, where a power and a count of the preamble are increased, and a transmission parameter of the PUSCH may be maintained or may be adjusted.

In an implementation, the terminal device determines that a number of transmissions of the first message to the network device in the first-type random access process reaches a first threshold, and falls back from the first-type random access process to the second-type random access process. For example, in a 2-step RACH process, a number of transmissions of the MSG1 to the network device by the terminal device reaches N times (for example, 5 times), the terminal device falls back from the first-type random access process to the second-type random access process.

In an implementation, the terminal device determines that a number of times of initiating the first-type random access process to the network device reaches a second threshold, and falls back from the first-type random access process to the second-type random access process. For example, a number of times of initiating a 2-step RACH process to the network device by the terminal device reaches M times (for example, 3 times), the terminal device falls back from the first-type random access process to the second-type random access process.

In an implementation, the terminal device determines, based on a channel detection result, to fall from the first-type random access process back to the second-type random access process. For example, if the terminal device detects that path loss exceeds a threshold in a 2-step RACH process, the terminal device falls back from the first-type random access process to the second-type random access process.

Figure 6:
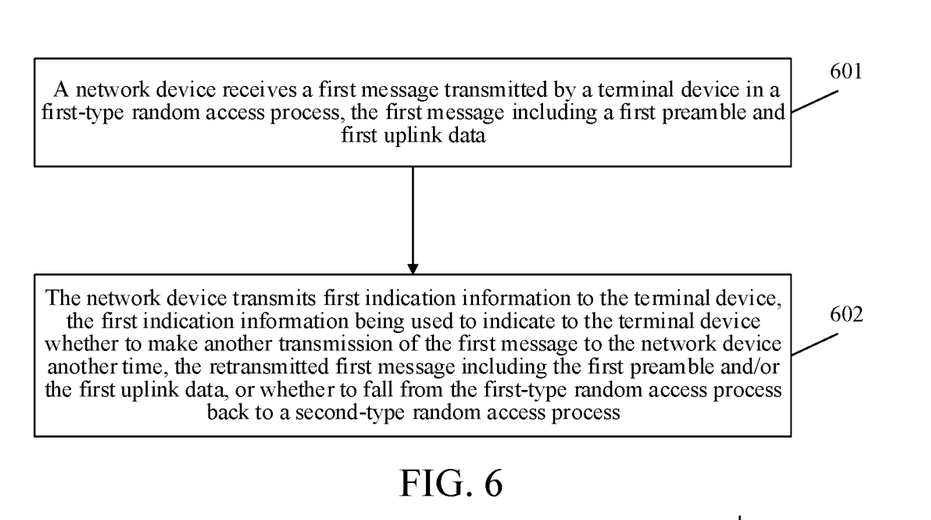
FIG. 6 is a schematic flowchart 2 of a method for transmitting information according to an embodiment of this application.

FIG. 6 is a schematic flowchart 2 of a method for transmitting information according to an embodiment of this application. As shown in FIG. 6, the method for transmitting information includes the following steps.

Step 601: A network device receives a first message transmitted by a terminal device in a first-type random access process, the first message including a first preamble and first uplink data.

In this embodiment of this application, the network device may be a base station, such as a gNB in 5G, an eNB in LTE, and the like.

In this embodiment of this application, the terminal device may be any device capable of communicating with a network device, for example, a mobile phone, a tablet computer, a notebook computer, and an in-vehicle terminal.

In this embodiment of this application, the terminal device may perform the 2-step RACH process (referring to FIG. 3), or may perform the 4-step RACH process (referring to FIG. 2). Herein, the 2-step RACH process is also referred to as the first-type random access process, and the 4-step RACH process is also referred to as the second-type random access process.

In an implementation, the terminal device needs to perform the first-type random access process (that is, the 2-step RACH process) to reduce latency, so that the terminal device needs to transmit a first preamble and first uplink data to a network device by using a first message in the first step, where the first message may also be referred to as an MSG1, the first uplink data is transmitted through a PUSCH, and the first uplink data, for example, includes information of a specific temporary identity of the terminal device. After the terminal device transmits the first preamble and the first uplink data, the reception situation of the first message by the network device may be as follows: (1) the network device receives only the first preamble; (2) the network device receives only the first uplink data; (3) the network device simultaneously receives the first preamble and the first uplink data; and 4) the network device does not receive the first preamble and the first uplink data. The reception situations that can be determined by the network device are the foregoing (1), (2) and (3). The reception situation (4) can only be determined by the terminal device. For the reception situation (3), the network device and the terminal device may continue performing the first-type random access process, that is, the 2-step RACH process. For the reception situations (1) and (2), the network device needs to transmit first indication information to the terminal device, where the first indication information is used to indicate to the terminal device whether to make another transmission of the first message to the network device another time, or whether to fall from the first-type random access process back to the second-type random access process. Further, if the first indication information is used to indicate to the terminal device whether to make another transmission of the first message to the network device another time, the first indication information further indicates content of the retransmitted first message and a corresponding transmission parameter.

Step 602: The network device transmits first indication information to the terminal device, the first indication information being used to indicate to the terminal device whether to make another transmission of the first message to the network device another time, the retransmitted first message including the first preamble and/or the first uplink data, or whether to fall from the first-type random access process back to a second-type random access process.

In this embodiment of this application, a specific behavior indicated by the first indication information is determined based on the reception situation of the first message by the network device. In an implementation, the implementation of the first indication information includes an explicit indication and an implicit indication. The explicit indication includes explicitly carrying the first indication information in the MSG2 in the 2-step RACH process. The implicit indication includes determining the first indication information based on an RNTI used for PDCCH scrambling for transmitting the MSG2. The following describes the specific behavior indicated by the first indication information with reference to the reception situation of the first message by the network device.

(1) In a case that the network device receives the first preamble without receiving the first uplink data.

(1.1) The first indication information is used to instruct to make another transmission of the first message another time, where the retransmitted first message includes the first uplink data, or the retransmitted first message includes the first uplink data and the first preamble.

In a case that the retransmitted first message includes the first uplink data, the first indication information is further used to instruct the terminal device to adjust, when retransmitting the first message, a transmission parameter of the first uplink data.

In a case that the retransmitted first message includes the first uplink data and the first preamble, the first indication information is further used to instruct the terminal device adjust, when retransmitting the first message, a transmission parameter of the first uplink data, maintain a transmission power of the first preamble, and maintain a counter for recording a number of transmissions of the first preamble.

Herein, the transmission parameter of the first uplink data includes at least one of the following: a transmission power, a transmission resource, and an MCS.

The transmission power of the first uplink data includes a power offset parameter, the power offset parameter being used to indicate an offset of a power of the first uplink data from a power of the first preamble.

The transmission resource of the first uplink data is an uplink data channel resource associated with the first preamble, where the first preamble has an association relationship with one or more uplink data channel resources.

For example, in the 2-step RACH process, the terminal device transmits an MSG1 to the network device, the MSG1 including a preamble and a PUSCH, the network device receives only the preamble, the network device instructs the terminal device to make another transmission of the MSG1 another time, and the MSG1 may include only a PUSCH without a preamble, or may include both a PUSCH and a preamble. If the retransmitted MSG1 includes both a PUSCH and a preamble, a power of the preamble and a count of a number of transmissions of the preamble are not increased, but a transmission parameter of the PUSCH is adjusted; and if the retransmitted MSG1 includes only a PUSCH, a transmission parameter the PUSCH needs to be adjusted. Herein, adjusting a transmission parameter of the PUSCH includes adjusting a power offset of the PUSCH, and/or using another PUSCH resource associated with the preamble, and/or adjusting an MCS mode of the PUSCH, and the like.

(1.2) The first indication information is used to instruct to fall from the first-type random access process back to the second-type random access process.

Specifically, the network device transmits a second message to the terminal device, the second message including an RAR message; the network device receives a third message transmitted by the terminal device, the third message including the first uplink data; and the network device transmits a fourth message to the terminal device, the fourth message including a contention resolution message.

For example, in the 2-step RACH process, the terminal device transmits an MSG1 to the network device, the MSG1 including a preamble and a PUSCH, the network device receives only the preamble, the network device instructs the terminal device to fall back to the 4-step RACH process, and the terminal device continues to perform the 4-step RACH process. In this case, the preamble of the MSG1 received in the 2-step RACH process is used as an MSG1 in the 4-step RACH process, and the network device subsequently transmits an RAR message to the terminal device in the 4-step RACH process.

(2) In a case that the network device receives the first uplink data without receiving the first preamble.

A probability that the network device receives only the first uplink data is relatively low. In the 4-step RACH process, a preamble is first transmitted for open-loop power control. After the base station detects the preamble and feeds back an RAR, UE sends a PUSCH carrying an MSG3. If a power of the preamble is not large enough to be detected by the base station, the PUSCH is not very likely to be detected by the gNB, but a case that the network device receives only the PUSCH is not excluded in this embodiment of this application.

(2.1) the first indication information is used to instruct to make another transmission of the first message another time, where the retransmitted first message includes the first preamble, or the retransmitted first message includes the first preamble and the first uplink data.

In a case that the retransmitted first message includes the first preamble, the first indication information is further used to instruct the terminal device to adjust, when retransmitting the first message, a transmission power of the first preamble and a counter for recording a number of transmissions of the first preamble.

In a case that the retransmitted first message includes the first preamble and the first uplink data, the first indication information is further used to instruct the terminal device to adjust, when retransmitting the first message, a transmission power of the first preamble and a counter for recording a number of transmissions of the first preamble, and maintain a transmission parameter of the first uplink data.

Herein, the transmission parameter of the first uplink data includes at least one of the following: a transmission power, a transmission resource, and an MCS.

The transmission power of the first uplink data includes a power offset parameter, the power offset parameter being used to indicate an offset of a power of the first uplink data from a power of the first preamble.

The transmission resource of the first uplink data is an uplink data channel resource associated with the first preamble, where the first preamble has an association relationship with one or more uplink data channel resources.

For example, in the 2-step RACH process, the terminal device transmits an MSG1 to the network device, the MSG1 including a preamble and a PUSCH, the network device receives only the PUSCH, the network device instructs the terminal device to make another transmission of the MSG1 another time, and the MSG1 may include only a preamble without a PUSCH, or may include both a preamble and a PUSCH. If the retransmitted MSG1 includes both a preamble and a PUSCH, a power and a count of the preamble are increased, and a transmission parameter of the PUSCH may be maintained; and if the retransmitted MSG1 includes only a preamble, a power and a count of the preamble need to be increased.

(2.2) The first indication information is used to instruct not to make another transmission of the first message another time, to continue performing the first-type random access process.

Specifically, the network device transmits a fifth message to the terminal device, the fifth message including an RAR message and/or a contention resolution message.

For example, in the 2-step RACH process, the terminal device transmits an MSG1 to the network device, the MSG1 including a preamble and a PUSCH, the network device receives only the PUSCH, and the network device instructs the terminal device not to make another transmission of the MSG1 another time, to continue performing the 2-step RACH process, that is, the network device transmits MSG2 to the terminal device. Herein, the PUSCH of the MSG1, carrying UE identity information, is successfully received by the network device. A conflict may be resolved by using the MSG2, and there is no need to transmit the MSG1 again.

Figure 7:
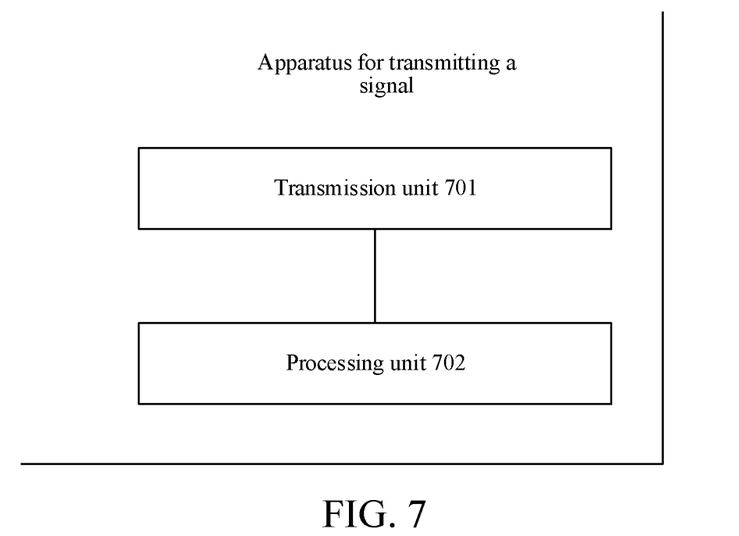
FIG. 7 is a schematic structural composition diagram 1 of an apparatus for transmitting a signal according to an embodiment of this application.

FIG. 7 is a schematic structural composition diagram 1 of an apparatus for transmitting a signal according to an embodiment of this application. As shown in FIG. 7, the apparatus includes:

a transmission unit 701, configured to transmit, in a first-type random access process, a first message to a network device, and obtain first indication information from the network device, the first message including a first preamble and first uplink data; and a processing unit 702, configured to determine, based on the first indication information, whether to make another transmission of the first message to the network device another time, the retransmitted first message including the first preamble and/or the first uplink data, or whether to fall from the first-type random access process back to a second-type random access process.

In an implementation, the first indication information is used to instruct to make another transmission of the first message another time, where the retransmitted first message includes the first uplink data, or the retransmitted first message includes the first uplink data and the first preamble.

In an implementation, in a case that the retransmitted first message includes the first uplink data, the transmission unit 701 is further configured to: adjust, when retransmitting the first message, a transmission parameter of the first uplink data.

In an implementation, in a case that the retransmitted first message includes the first uplink data and the first preamble, the transmission unit 701 is further configured to: adjust, when retransmitting the first message, a transmission parameter of the first uplink data, maintain a transmission power of the first preamble, and maintain a counter for recording a number of transmissions of the first preamble.

In an implementation, the first indication information is used to instruct to fall from the first-type random access process back to the second-type random access process.

In an implementation, in a case that the terminal device falls back to the second-type random access process, the transmission unit 701 is further configured to: receive a second message transmitted by the network device, the second message including an RAR message; transmit a third message to the network device, the third message including the first uplink data; and receive a fourth message transmitted by the network device, the fourth message including a contention resolution message.

In an implementation, the first indication information is used to instruct to make another transmission of the first message another time, where the retransmitted first message includes the first preamble, or the retransmitted first message includes the first preamble and the first uplink data.

In an implementation, in a case that the retransmitted first message includes the first preamble, the transmission unit 701 is further configured to: adjust, when retransmitting the first message, a transmission power of the first preamble and a counter for recording a number of transmissions of the first preamble.

In an implementation, in a case that the retransmitted first message includes the first preamble and the first uplink data, the transmission unit 701 is further configured to: adjust, when retransmitting the first message, a transmission power of the first preamble and a counter for recording a number of transmissions of the first preamble, and maintain a transmission parameter of the first uplink data.

In an implementation, the first indication information is used to instruct not to make another transmission of the first message another time, to continue performing the first-type random access process.

In an implementation, the transmission unit 701 is further configured to receive a fifth message transmitted by the network device, the fifth message including an RAR message and/or a contention resolution message.

In an implementation, the transmission parameter of the first uplink data includes at least one of the following: a transmission power, a transmission resource, and an MCS.

In an implementation, the transmission power of the first uplink data includes a power offset parameter, the power offset parameter being used to indicate an offset of a power of the first uplink data from a power of the first preamble.

In an implementation, the transmission resource of the first uplink data is an uplink data channel resource associated with the first preamble, where the first preamble has an association relationship with one or more uplink data channel resources.

In an implementation, the processing unit 702 is further configured to: determine that a number of transmissions of the first message to the network device in the first-type random access process reaches a first threshold, and falls back from the first-type random access process to the second-type random access process.

In an implementation, the processing unit 702 is further configured to: determine that a number of times of initiating the first-type random access process to the network device reaches a second threshold and fall from the first-type random access process back to the second-type random access process.

In an implementation, the processing unit 702 is further configured to determine, based on a channel detection result, to fall from the first-type random access process back to the second-type random access process.

A person skilled in the art should understand that, related descriptions of the foregoing apparatus for transmitting a signal in the embodiments of this application may be understood by referring to related descriptions of the method for transmitting a signal in the embodiments of this application.

Figure 8:
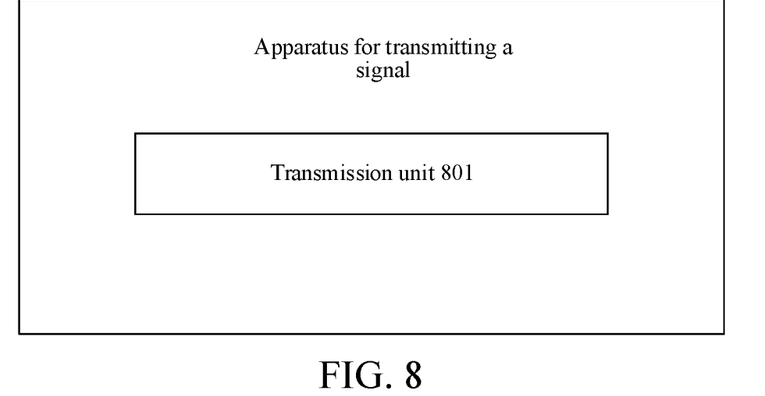
FIG. 8 is a schematic structural composition diagram 2 of an apparatus for transmitting a signal according to an embodiment of this application.

FIG. 8 is a schematic structural composition diagram 2 of an apparatus for transmitting a signal according to an embodiment of this application. As shown in FIG. 8, the apparatus includes:

a transmission unit 801, configured to receive, in a first-type random access process, a first message transmitted by a terminal device, the first message including a first preamble and first uplink data; transmit first indication information to the terminal device, the first indication information being used to indicate to the terminal device whether to make another transmission of the first message to the network device another time, the retransmitted first message including the first preamble and/or the first uplink data, or whether to fall from the first-type random access process back to a second-type random access process.

In an implementation, in a case that the network device receives the first preamble without receiving the first uplink data, the first indication information is used to instruct to make another transmission of the first message another time, where the retransmitted first message includes the first uplink data, or the retransmitted first message includes the first uplink data and the first preamble.

In an implementation, in a case that the retransmitted first message includes the first uplink data, the first indication information is further used to instruct the terminal device to adjust, when retransmitting the first message, a transmission parameter of the first uplink data.

In an implementation, in a case that the retransmitted first message includes the first uplink data and the first preamble, the first indication information is further used to instruct the terminal device to adjust, when retransmitting the first message, a transmission parameter of the first uplink data, maintain a transmission power of the first preamble, and maintain a counter for recording a number of transmissions of the first preamble.

In an implementation, in a case that the network device receives the first preamble without receiving the first uplink data, the first indication information is used to instruct to fall from the first-type random access process back to the second-type random access process.

In an implementation, in a case of falling back from the first-type random access process to the second-type random access process, the transmission unit 801 is further configured to: transmit a second message to the terminal device, the second message including an RAR message; receive a third message transmitted by the terminal device, the third message including the first uplink data; and transmit a fourth message to the terminal device, the fourth message including a contention resolution message.

In an implementation, in a case that the network device receives the first uplink data without receiving the first preamble, the first indication information is used to instruct to make another transmission of the first message another time, where the retransmitted first message includes the first preamble, or the retransmitted first message includes the first preamble and the first uplink data.

In an implementation, in a case that the retransmitted first message includes the first preamble, the first indication information is further used to instruct the terminal device to adjust, when retransmitting the first message, a transmission power of the first preamble and a counter for recording a number of transmissions of the first preamble.

In an implementation, in a case that the retransmitted first message includes the first preamble and the first uplink data, the first indication information is further used to instruct the terminal device to adjust, when retransmitting the first message, a transmission power of the first preamble and a counter for recording a number of transmissions of the first preamble, and maintain a transmission parameter of the first uplink data.

In an implementation, in a case that the network device receives the first uplink data without receiving the first preamble, the first indication information is used to instruct not to make another transmission of the first message another time, to continue performing the first-type random access process.

In an implementation, the transmission unit 801 is further configured to transmit a fifth message to the terminal device, the fifth message including an RAR message and/or a contention resolution message.

In an implementation, the transmission parameter of the first uplink data includes at least one of the following: a transmission power, a transmission resource, and an MCS.

In an implementation, the transmission power of the first uplink data includes a power offset parameter, the power offset parameter being used to indicate an offset of a power of the first uplink data from a power of the first preamble.

In an implementation, the transmission resource of the first uplink data is an uplink data channel resource associated with the first preamble, where the first preamble has an association relationship with one or more uplink data channel resources.

A person skilled in the art should understand that, related descriptions of the foregoing apparatus for transmitting a signal in the embodiments of this application may be understood by referring to related descriptions of the method for transmitting a signal in the embodiments of this application.

Figure 9:
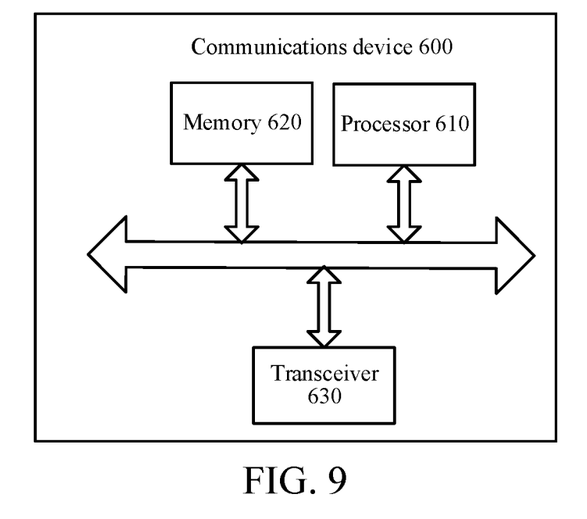
FIG. 9 is a schematic structural diagram of a communications device according to an embodiment of this application.

FIG. 9 is a schematic structural diagram of a communications device 600 according to an embodiment of this application. The communications device may be a terminal device or a network device. The communications device 600 shown in FIG. 9 includes a processor 610. The processor 610 may invoke a computer program from a memory and run the computer program, to implement the method in the embodiments of this application.

Optionally, as shown in FIG. 9, the communications device 600 may further include a memory 620. The processor 610 may invoke the computer program from the memory 620 and run the computer program, to implement the method in the embodiments of this application.

The memory 620 may be a component independent of the processor 610, or may be integrated into the processor 610.

Optionally, as shown in FIG. 9, the communications device 600 may further include a transceiver 630, and the processor 610 may control the transceiver 630 to communicate with other devices, to be specific, send information or data to other devices, or receive information or data sent by other devices.

The transceiver 630 may include a transmitter and a receiver. The transceiver 630 may further include an antenna, and a number of antennas may be one or more.

Optionally, the communications device 600 may be specifically the network device in the embodiments of this application, and the communications device 600 can implement corresponding procedures implemented by the network device in various methods in the embodiments of this application. For brevity, details are not described herein again.

Optionally, the communications device 600 may be specifically the mobile terminal/terminal device in the embodiments of this application, and the communications device 600 can implement corresponding procedures implemented by the mobile terminal/terminal device in various methods in the embodiments of this application. For brevity, details are not described herein again.

Figure 10:
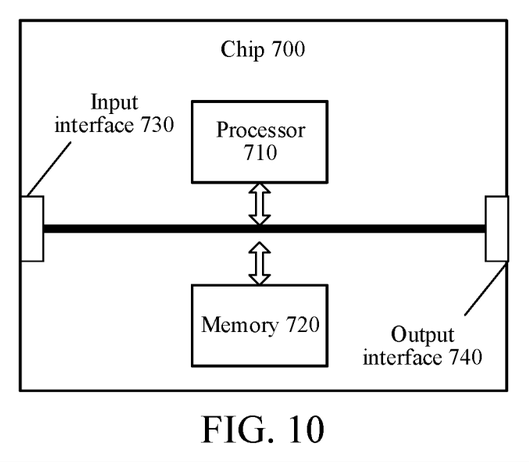
FIG. 10 is a schematic structural diagram of a chip according to an embodiment of this application.

FIG. 10 is a schematic structural diagram of a chip according to an embodiment of this application. The chip 700 shown in FIG. 10 includes a processor 710. The processor 710 may invoke a computer program from a memory and run the computer program, to implement the method in the embodiments of this application.

Optionally, as shown in FIG. 10, the chip 700 may further include a memory 720. The processor 710 may invoke the computer program from the memory 720 and run the computer program, to implement the method in the embodiments of this application.

The memory 720 may be a component independent of the processor 710, or may be integrated into the processor 710.

Optionally, the chip 700 may further include an input interface 730. The processor 710 may control the input interface 730 to communicate with another device or chip, and specifically, may obtain information or data sent by another device or chip.

Optionally, the chip 700 may further include an output interface 740. The processor 710 may control the output interface 740 to communicate with another device or chip, and specifically, may output information or data to another device or chip.

Optionally, the chip may be applied to the network device in the embodiments of this application, and the chip can implement corresponding procedures implemented by the network device in various methods in the embodiments of this application. For brevity, details are not described herein again.

Optionally, the chip may be applied to the mobile terminal/terminal device in the embodiments of this application, and the chip can implement corresponding procedures implemented by the mobile terminal/terminal device in various methods in the embodiments of this application. For brevity, details are not described herein again.

It should be noted that, the chip mentioned in the embodiments of this application may also be referred to as a system-level chip, a system chip, a chip system, a system on chip, or the like.

Figure 11:
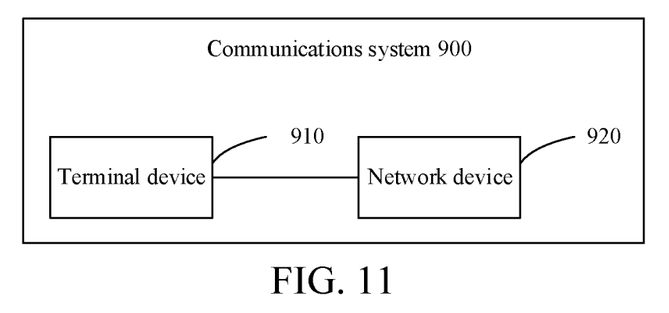
FIG. 11 is a schematic block diagram of a communications system according to an embodiment of this application.

FIG. 11 is a schematic block diagram of a communications system 900 according to an embodiment of this application. As shown in FIG. 9, the communications system 900 includes a terminal device 910 and a network device 920.

The terminal device 910 may be configured to implement the corresponding functions implemented by the terminal device in the foregoing method, and the network device 920 may be configured to implement the corresponding functions implemented by the network device in the foregoing method. For brevity, details are not described herein again.

It should be understood that, the processor of this embodiment of this application may be an integrated circuit chip, and has a signal processing capability. In an implementation process, steps in the foregoing method embodiments can be implemented by using a hardware integrated logical circuit in the processor or by using instructions in a form of software. The processor may be a general-purpose processor, a digital signal processor (DSP), an application-specific integrated circuit (ASIC), a field-programmable gate array (FPGA), another programmable logic device, a discrete gate or a transistor logic device, or a discrete hardware component. The processor may implement or perform methods, steps and logical block diagrams disclosed in this embodiment of this application. The general purpose processor may be a microprocessor or the processor may be any conventional processor or the like. Steps of the methods disclosed with reference to the embodiments of this application may be directly performed and completed by using a hardware decoding processor or may be performed and completed by using a combination of hardware and a software module in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory, and completes the steps of the foregoing methods in combination with hardware of the processor.

It may be understood that the memory in the embodiments of this application may be a volatile memory or a nonvolatile memory, or may include a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM). It should be noted that the memory in the system and the method described in this specification aims to include, but is not limited to, the memories and any other suitable type of memories.

It should be understood that, the memory is an example but is not intended for limitation. For example, the memory in the embodiments of this application may alternatively be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct Rambus RAM (DR RAM), or the like. That is, the memory in this embodiment of this application aims to include, but is not limited to, the memories and any other suitable type of memories.

An embodiment of this application further provides a computer-readable storage medium, configured to store a computer program.

Optionally, the computer-readable storage medium may be applied to the network device in the embodiments of this application, and the computer program causes a computer to implement corresponding procedures implemented by the network device in various methods in the embodiments of this application. For brevity, details are not described herein again.

Optionally, the computer-readable storage medium may be applied to the mobile terminal/terminal device in the embodiments of this application, and the computer program causes a computer to implement corresponding procedures implemented by the mobile terminal/terminal device in various methods in the embodiments of this application. For brevity, details are not described herein again.

An embodiment of this application further provides a computer program product, including a computer program instruction.

Optionally, the computer program product may be applied to the network device in the embodiments of this application, and the computer program instruction causes a computer to implement corresponding procedures implemented by the network device in various methods in the embodiments of this application. For brevity, details are not described herein again.

Optionally, the computer program product may be applied to the mobile terminal/terminal device in the embodiments of this application, and the computer program instruction causes a computer to implement corresponding procedures implemented by the mobile terminal/terminal device in various methods in the embodiments of this application. For brevity, details are not described herein again.

An embodiment of this application further provides a computer program.

Optionally, the computer program may be applied to the network device in the embodiments of this application, and the computer program, when run on a computer, causes the computer to implement corresponding procedures implemented by the network device in various methods in the embodiments of this application. For brevity, details are not described herein again.

Optionally, the computer program may be applied to the mobile terminal/terminal device in the embodiments of this application, and the computer program, when run on a computer, causes the computer to implement corresponding procedures implemented by the mobile terminal/terminal device in various methods in the embodiments of this application. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are executed in the manner of hardware or software depends on specific applications and design constraints of the technical solutions. A person skilled in the art may use different methods to implement the described functions for each particular application, but it should not be considered that the implementation goes beyond the scope of this application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a signal, comprising:
    transmitting, by a terminal device in a first-type random access process, a first message to a network device, the first-type random access process being a 2-step random access channel (RACH) process and the first message comprising a first preamble and first uplink data;
    obtaining, by the terminal device, first indication information from the network device, the first indication information indicating to the terminal device whether to make another transmission of one of the followings to the network device: (a) the first preamble, (b) the first uplink data, and (c) the first preamble and the first uplink data; and
    determining, by the terminal device based on the first indication information, whether to make another transmission of the one of: (a) the first preamble, (b) the first uplink data, and (c) the first preamble and the first uplink data,
    wherein the first indication information instructs to make another transmission of the first message another time, wherein the retransmitted first message comprises the first preamble, or the retransmitted first message comprises the first preamble and the first uplink data.

2. The method according to claim 1, further comprising:
    determining, by the terminal device, that a number of transmissions of the first message to the network device in the first-type random access process reaches a first threshold, and
    falling from the first-type random access process back to a second-type random access process.

3. A method for transmitting a signal, comprising:
    receiving, by a network device in a first-type random access process, a first message transmitted by a terminal device, the first-type random access process being a 2-step random access channel (RACH) process, and the first message comprising a first preamble and first uplink data; and
    transmitting, by the network device, first indication information to the terminal device, the first indication information indicating to the terminal device whether to make another transmission of one of the followings to the network device: (a) the first preamble, (b) the first uplink data, and (c) the first preamble and the first uplink data,
    wherein the first indication information instructs to make another transmission of the first message another time, wherein the retransmitted first message comprises the first preamble, or the retransmitted first message comprises the first preamble and the first uplink data.

4. A terminal device, comprising a processor and a memory, wherein the memory is configured to store a computer program, and the processor is configured to invoke and run the computer program stored in the memory, to perform the method:
    transmitting, by a terminal device in a first-type random access process, a first message to a network device, the first-type random access process being a 2-step random access channel (RACH) process and the first message comprising a first preamble and first uplink data;
    obtaining first indication information from the network device, the first indication information indicating to the terminal device whether to make another transmission of one of the followings to the network device: (a) the first preamble, (b) the first uplink data, and (c) the first preamble and the first uplink data; and
    determining, by the terminal device based on the first indication information, whether to make another transmission of the first preamble and the first uplink data the one of: (a) the first preamble, (b) the first uplink data, and (c) the first preamble and the first uplink data,
    wherein the first indication information instructs to make another transmission of the first message another time, wherein the retransmitted first message comprises the first preamble, or the retransmitted first message comprises the first preamble and the first uplink data.

5. The terminal device according to claim 4, the processor is further configured to invoke and run the computer program stored in the memory, to perform:
    determining, by the terminal device, that a number of transmissions of the first message to the network device in the first-type random access process reaches a first threshold, and
    falling from the first-type random access process back to a second-type random access process.

6. A network device, comprising a processor and a memory, wherein the memory is configured to store a computer program, and the processor is configured to invoke and run the computer program stored in the memory, to perform the method:
    receiving, by a network device in a first-type random access process, a first message transmitted by a terminal device, the first-type random access process being a 2-step random access channel (RACH) process, and the first message comprising a first preamble and first uplink data; and
    transmitting, by the network device, first indication information to the terminal device, the first indication information indicating to the terminal device whether to make another transmission of one of the followings to the network device: (a) the first preamble, (b) the first uplink data, and (c) the first preamble and the first uplink data,
    wherein the first indication information instructs to make another transmission of the first message another time, wherein the retransmitted first message comprises the first preamble, or the retransmitted first message comprises the first preamble and the first uplink data.

* * * * *